Dec. 17, 1957  P. W. KOONTZ  2,816,674
DRUM TRUCK

Filed Feb. 25, 1955  3 Sheets-Sheet 1

INVENTOR.
PIERCE W. KOONTZ,
BY: Harold B. Hood.
ATTORNEY.

Dec. 17, 1957  P. W. KOONTZ  2,816,674
DRUM TRUCK
Filed Feb. 25, 1955  3 Sheets-Sheet 2

INVENTOR.
PIERCE W. KOONTZ,
BY Harold B. Hood.
ATTORNEY

Dec. 17, 1957 P. W. KOONTZ 2,816,674
DRUM TRUCK
Filed Feb. 25, 1955 3 Sheets-Sheet 3

INVENTOR.
PIERCE W. KOONTZ,
BY: Harold B. Hood.
ATTORNEY.

United States Patent Office 2,816,674
Patented Dec. 17, 1957

2,816,674

DRUM TRUCK

Pierce W. Koontz, Bloomington, Ind.

Application February 25, 1955, Serial No. 490,462

7 Claims. (Cl. 214—384)

This invention relates to a drum truck for use in transporting heavy drums from one place to another. More particularly, this invention relates to a drum truck which can be tilted forwardly into juxtaposition with a drum to bring engaging members on the truck into position beneath a ridge on the drum and then tilted rearwardly to lift the drum off the ground and into supported relation with the drum truck, prior to transportation of the drum by the truck to the desired location.

An object of this invention is to provide a novel drum truck which can be easily manipulated by a single operator to pick up, transport, and set down large and heavy drums.

A further object is to provide such a truck which is so constructed as to be capable of handling drums to and from storage areas in which such drums are arranged in close juxtaposition to each other.

A further object of this invention is to provide a drum truck which is simple in construction, safe and dependable in use, and economical to manufacture.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
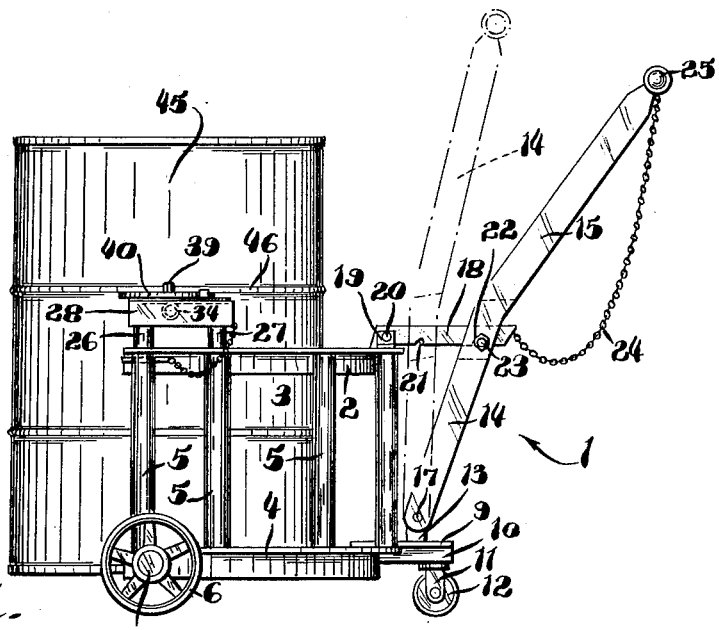
Fig. 1 is a side elevational view of the drum truck which forms my invention, the truck being shown in supporting engagement with a drum.

Referring to the drawings, the drum truck 1 is shown as being provided with a frame 2 composed of upper and lower angle bars or rails 3 and 4 joined as by welding to the opposite ends of tubular members 5. Those portions of rail 4 directly below all of tubes 5, and those portions of rail 3 directly above all but the two forward tubes 5 on each side of the frame, are solid; whereas, directly above the two forward tubes 5 on each side of the frame, rail 3 is provided with apertures coaxial with the hollow portion of each of these tubes for a purpose later to be described. The internal outline of the frame 2 is of such dimensions as to accommodate therewithin a standard drum which has a diameter of two feet. Obviously, the truck may be made in other sizes to accommodate other standard sizes of drums or analogous articles. Integral with the frame adjacent its bottom portion are axles 8, 8 which support wheels 6 and 7, respectively.

A rearwardly projecting extension 9 is fixed at its underside to the upper portion of rail 4 and the upper portion of plate 10. Roller wheel 12 is connected to plate 10 by means of a swivelly mounted bracket 11. Wheels 6, 7 and 12 provide three point contact for the drum truck on its supporting surface.

Bearing bracket 13 pivotally supports handle 14 by means of a pivot bolt 17. Handle 14 is formed of two side straps 15, 15 held in spaced relation by bracket 13, bolt 23, and intermediate straps 16, 16'. Straps 15, 15 are secured to intermediate straps 16, 16' as by welding, and a handle grip 25 is fixed to the upper portion of strap 16. Link 18 is pivoted to upper rail 3 by means of angle brackets 19, 19 and pin 20. As is apparent from the drawings, link 18 may be pivoted upwardly from the position shown in Fig. 1 and handle 14 may then be pivoted forwardly from full line position where transverse bolt 23 lies in recess 22 in link 18, to dotted line position where bolt 23 lies in recess 21 in link 18. The lower end of strap 16 limits the upward swing of link 18. Chain 24 provides a convenient means to swing the free end of link 18. When the drum truck is not in use, handle 14 may be set in the adjusted position shown in dotted lines in Fig. 1. When the handle is in this position, the truck will occupy less storage space than that occupied when it is in the full line position shown in Fig. 1.

Means to engage the drum to pick it up and support it are provided adjacent the forward portion of the frame at each side thereof. The two means are identical, being mirror images of each other, and therefore only the drum-engaging means on one side of the frame will be described in detail.

Figure 5:
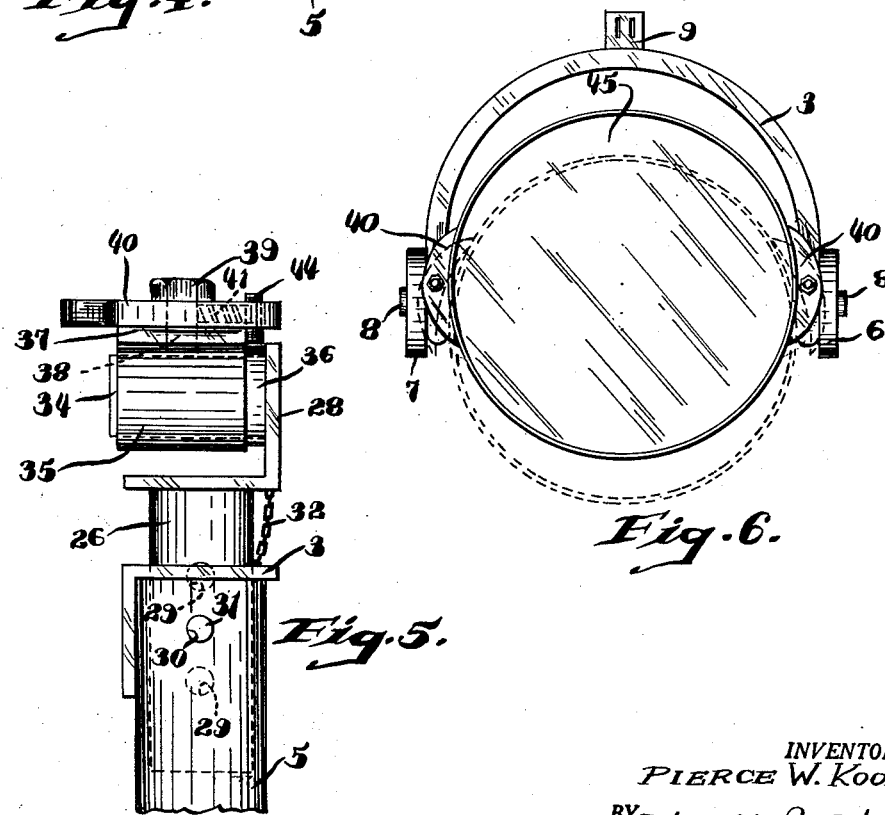
Fig. 5 is a side elevational view taken from the lefthand side of Fig. 4.
Figure 6:
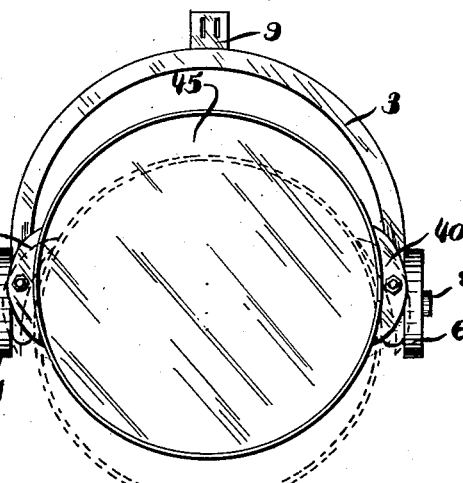
Fig. 6 is a top view of the drum truck showing the relative positions of the parts in dotted lines when the drum-engaging members first abut the drum, and in full lines when the relative movement between the drum-engaging members to drum-supporting position is completed.

Cylindrical members 26 and 27 are telescopically arranged in the two forwardmost tubes 5 of the frame. The aforementioned coaxial openings in rail 3 above each of the forwardmost tubes provide access to these tubes for members 26 and 27. Angular bracket 28 is secured at its bottom side to the upper ends of members 26 and 27 as best shown in Fig. 5. The vertical height of member 28 is adjustable by inserting pin 31 through apertures 30, 30 in forwardmost tube 5 and any selected one of vertically spaced apertures 29 in member 26. Chain 32 provides convenient means to prevent loss or misplacement of pin 31.

Figure 4:
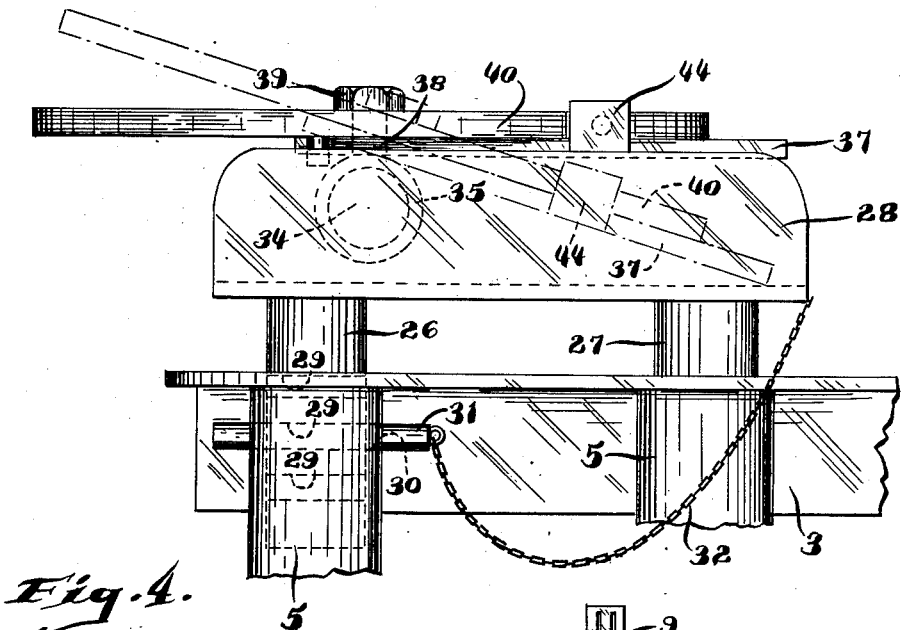
Fig. 4 is an enlarged view of one of the drum-engaging members and the supporting means therefor on the frame of the truck, the drum-engaging members being shown in full lines in drum-supporting position, and broken lines when in rearwardly tilted, at rest position.
Figure 7:
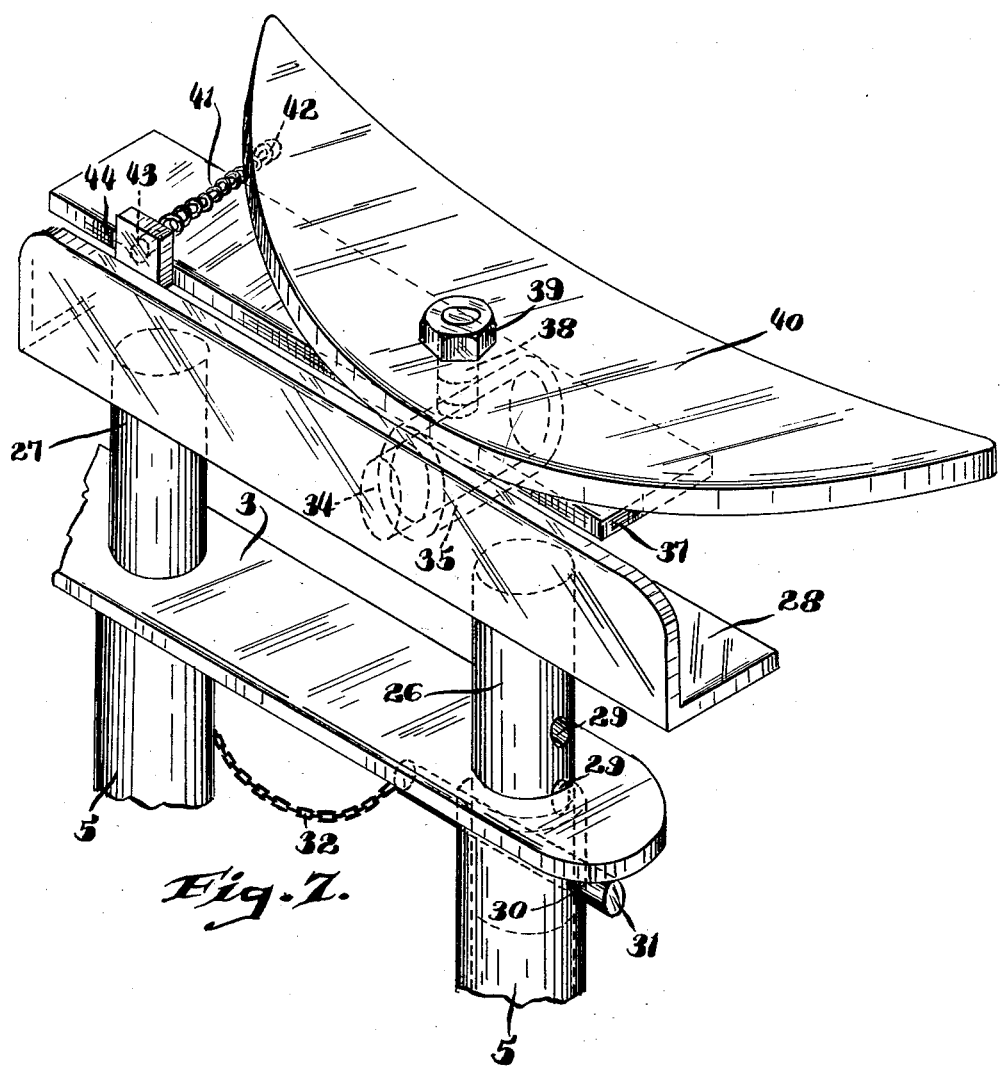
Fig. 7 is a perspective view of the other drum-engaging member and its directly-associated parts.

Referring more particularly to Figs. 4, 5 and 7, it will be apparent that bracket 28 has rigidly fixed thereto a laterally-extending, cylindrical journal pin 34. Tubular section 35 is sleeved on pin 34 and positioned in laterally adjustable relation thereon by the optional provision of annular spacing shim 36. A plurality of shims are available in a number of different widths to vary the lateral position of section 35 on pin 34. If desired, the shim may be dispensed with to position the inner end of section 35 in abutting relation with the upstanding portion of bracket 28. Welded or otherwise secured to section 35 is a plate 37. Drum-engaging member 40 is pivotally mounted on plate 37 by means of pin 38, one end of which is fixedly embedded in plate 37 in perpendicular relation to the axis of tubular section 35 and the other end of which is threaded to receive nut 39. Alternatively, pin 38 may be threadedly seated in a suitably threaded bore in plate 37 to abut against section 35, and may be provided with an integral head 39. It is apparent from Fig. 4 that the respective axes of pin 38 and journal pin 34 intersect and lie in a common plane. Pin 38 passes loosely through an aperture in member 40 to permit member 40 to pivot thereabout.

Compression spring 41 is frictionally received at one end in socket 42 in drum-engaging member 40 and at the other end in socket 43 in lug 44 which is fixed to the side of plate 37. This arrangement permits convenient replacement of the spring if it should become damaged in any way.

It will be understood that the pins 34 on each side of the frame 2 are coaxial with each other, and that therefore, the axes of pins 34, 34 and pins 38, 38 all lie in a common plane.

With the drum truck standing empty, it will be in upright position with all three wheels 6, 7 and 12 in engagement with the drum truck supporting surface. Since the center of gravity of all the drum-engaging parts which pivot about each of journal pins 34, 34 is rearwardly of the axis of pin 34, drum-engaging members 40 will lie in a position of rest in which the rearwardly extending portions tilt downwardly with the rearward edge of each of plates 37, 37 in movement-limiting abutment with the upper surface of the horizontal leg of its respective bracket 28, as shown in broken lines in Fig. 4. Compression springs 41, 41 hold the rearwardly extending portions of members 40, 40 in inwardly, resiliently-biased positions and the forwardly extending portions in outwardly resiliently-biased, spread relation.

With the parts thus arranged, the drum truck is wheeled into juxtaposition with a drum to be transported. Handle 14 is positioned with its bolt 23 in recess 22 if not already so positioned. The drum truck is then grasped at the handle grip 25 by an operator and tilted forwardly to bring drum-engaging members 40, 40 initially into engagement with the drum 45 below a rib 46 thereof. The inwardly biased, rearwardly extending portions of members 40, 40 first engage the sides of the drum 45. Continued forward movement of the drum truck will cause members 40, 40 to pivot about pins 38, 38, respectively, and thereby finally bring the forwardly projecting portions of the drum-engaging members into abutting relation with the sides of the drum. At this point, continued forward movement along the sides of the drum is prevented since members 40, 40 are so shaped that the entire lateral, drum-engaging surfaces of each of members 40, 40 are in engagement with the drum, and the members 40, 40 can no longer pivot about pins 38, 38, respectively. As shown in Fig. 3, members 40, 40 are then located directly beneath a rib or ridge 46 on the drum 45 and pins 34, 34 are located at substantially diametrically opposed points on the drum. The operator then preferably exerts pressure downwardly and forwardly with one foot against extension 9 and also pulls downwardly and rearwardly on handle grip 25. As the wheels 6, 6 move forwardly, while the members 40, 40 are held by the drum and by the operator against further forward movement, the effect will be to tilt the drum truck to upright position, to lift the drum by the resultant upward movement of members 40, 40 against the underside of ridge 46, and to bring the drum to the position illustrated in Figs. 1 and 2. Once the drum bottom has been lifted from the floor, it will tend to move about the common axis of the pins 34, into an upright position. Thus the bottom of the drum swings, from its initial position, toward the rear of the truck, whereby removal of a drum from a close rank of drums is facilitated. At this position the drum is securely held in elevated relation and the drum can be wheeled to the desired location. After being wheeled to the desired location, the truck is tilted forwardly, as before, and the drum 45 set down. The drum is released from the truck 1 by continued tilting movement and the drum truck is subsequently moved away from the newly located drum.

Figures 2, 3:
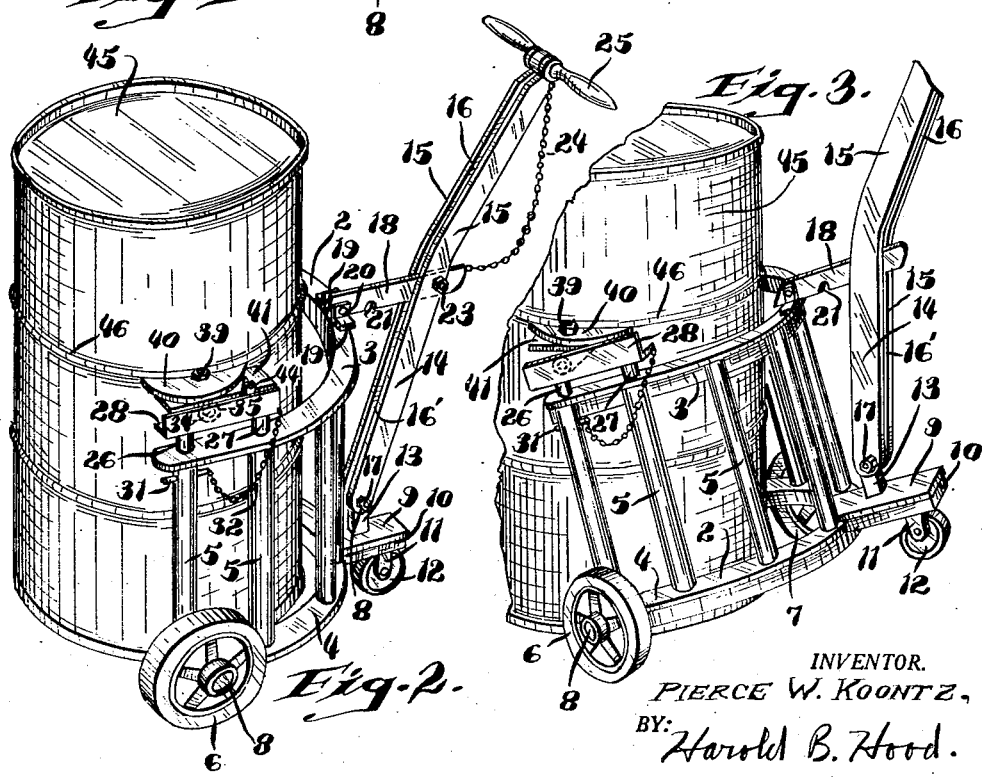
Fig. 2 is a view similar to that of Fig. 1 showing the parts in perspective.
Fig. 3 is a fragmentary, perspective view showing the drum truck in forwardly tilted position just prior to elevation of the drum into supported position on the truck.

When the drum 45 is in supported position on the truck 1 as shown in Fig. 1, pins 34, 34 are situated at substantially diametrically opposed points on the drum, and a vertical plane passing through the axes of pins 34, 34 and pins 38, 38, respectively, is located rearwardly of a vertical plane passing through the axles 8, 8. The force of gravity upon the drum will thereby hold the drum in balanced, elevated position with respect to the drum truck supporting surface and in stable position with respect to the drum truck until the truck is tilted forwardly to deposit the drum at the desired location. By this action, the drum is set down ahead of the wheels 6, 6, whereby a plurality of drums may be arranged in a close rank.

It is thus apparent that the truck which forms this invention fills the long-felt need for a simple, dependable means for picking up and transporting large and heavy articles such as drums.

I claim as my invention:

1. A drum truck comprising a frame having a pair of wheels on a common axis, a further wheel on an axis spaced from said common axis, two drum-engaging members, means mounting each of said members on said frame in laterally spaced relation and for pivotal movement about a substantially vertical axis and about a common horizontal axis, said horizontal axis lying in a vertical plane which, when all of said wheels are supported on a common plane, lies between a vertical plane including said common axis of said pair of wheels and a vertical plane including the axis of said further wheel.

2. A drum truck comprising a frame, two spaced drum-engaging members, each of said drum-engaging members including a forwardly and a rearwardly extending portion, a platform for each of said member, said platform being supported from said frame for pivotal movement about a common horizontal axis and each platform providing a trunnion located upon a substantially vertical axis which extends through its associated member between said forwardly and rearwardly extending portions thereof, each drum-engaging member being journalled on its associated trunnion such that upon relative movement of the rearwardly extending portions of the drum-engaging members against a drum at a level below a ridge on the drum, said forwardly extending portions will be pivoted from spread relation to closed relation, and thereby both forwardly and rearwardly extending portions will be located directly beneath the ridge on the drum prior to elevation of the drum by the drum truck, and spring means compressed between each platform and the rearwardly extending portion of its associated member and urging said rearwardly extending portions toward each other.

3. A drum truck comprising a frame, two spaced drum-engaging members, each of said drum-engaging members including a forwardly and a rearwardly extending portion, means mounting each of said members on said frame for pivotal movement about a vertical axis and a common horizontal axis, the vertical axis extending through each of said members and lying substantially between said forwardly and rearwardly extending portions such that upon relative movement of the rearwardly extending portions against a drum at a level below a ridge on the drum, said forwardly extending portions will be pivoted from spread relation to drum-engaging relation, and thereby both forwardly and rearwardly extending portions will be located directly beneath the ridge on the drum, a side wheel rotatably mounted at each side of the frame, said vertical and horizontal axes being so located that when the frame is in upright position, a vertical plane passing through either the common horizontal axis or through both vertical axes is spaced rearwardly of a vertical plane passing through the axes of rotation of said side wheels, and means for resiliently biasing the forwardly extending portions of said drum-engaging members about their respective vertical axes toward spread relation.

4. A device of the class described comprising a frame, a pair of laterally-spaced brackets, means mounting each of said brackets for vertical adjustment on said frame, a drum-engaging member for each of said brackets, means mounting each of said drum-engaging members on its respective bracket for pivotal movement about a vertical axis and a laterally-extending axis, the laterally-extending axis of each of said drum-engaging members being aligned with that of the other, and means supporting said frame for forward tilting movement to lower said drum-engaging members, said drum-engaging members being yieldably biased about their respective laterally-extending axes to downwardly inclined position at their rearward ends and about their respective vertical axes to relatively spread relation at their forward ends.

5. The device as set forth in claim 4 wherein said frame-supporting means comprises a pair of laterally-spaced side wheels and wheel means disposed rearwardly of said side wheels, and wherein all of said axes lie in a common vertical plane disposed, when the frame is in upright position, between the axes of rotation of said side wheels and the axis of rotation of said rearwardly disposed wheel means.

6. The device of claim 4 wherein said means for mounting each of the drum-engaging members on its respective bracket includes means for adjusting said pivotal axes of the drum-engaging members horizontally toward and away from each other.

7. The device of claim 4 including a handle mounted at the rear of the frame, and an extension at the rear of the frame engageable by the foot of an operator to aid in tilting the frame.

References Cited in the file of this patent

UNITED STATES PATENTS

| | | |
|---|---|---|
| 1,018,260 | Myrholm | Feb. 20, 1912 |
| 1,862,299 | Ciccone | June 7, 1932 |
| 1,964,119 | Hendry | June 26, 1934 |
| 2,077,349 | Hobbis | Apr. 13, 1937 |
| 2,444,992 | Kittel | July 13, 1948 |
| 2,453,246 | Moksnes | Nov. 9, 1948 |
| 2,584,918 | Salsas | Feb. 5, 1952 |
| 2,704,167 | Framhein | Mar. 15, 1955 |
| 2,706,060 | Ferrario | Apr. 12, 1955 |